(12) United States Patent
Blair

(10) Patent No.: US 11,249,047 B2
(45) Date of Patent: Feb. 15, 2022

(54) METHOD AND SYSTEM FOR DETECTING A MATERIAL DISCONTINUITY IN A MAGNETISABLE ARTICLE

(71) Applicant: JRB Engineering Pty Ltd, West Perth (AU)

(72) Inventor: Stewart Blair, Nedlands (AU)

(73) Assignee: Siemens Mobility Pty Ltd., Bayswater (AU)

(*) Notice: Subject to any disclaimer, the term of this patent is extended or adjusted under 35 U.S.C. 154(b) by 4 days.

(21) Appl. No.: 15/755,766

(22) PCT Filed: Aug. 31, 2016

(86) PCT No.: PCT/AU2016/050821
§ 371 (c)(1),
(2) Date: Feb. 27, 2018

(87) PCT Pub. No.: WO2017/035591
PCT Pub. Date: Mar. 9, 2017

(65) Prior Publication Data
US 2018/0328888 A1    Nov. 15, 2018

(30) Foreign Application Priority Data

Aug. 31, 2015 (AU) .............................. 2015903531

(51) Int. Cl.
*G01N 27/83* (2006.01)
(52) U.S. Cl.
CPC .................................. *G01N 27/83* (2013.01)
(58) Field of Classification Search
CPC .. G01N 27/72–9093; B61K 9/00; B61K 9/08; B61K 9/10; B61L 23/044; B61L 27/0055
See application file for complete search history.

(56) References Cited

U.S. PATENT DOCUMENTS 2,958,818 A * 11/1960 Cowan ..................... B61K 9/08
324/217
3,820,016 A * 6/1974 Gieskieng .............. G01N 27/82
324/213
(Continued)

FOREIGN PATENT DOCUMENTS

JP   2004279372 A   7/2004
SU      421728 A1   3/1974
(Continued)

OTHER PUBLICATIONS

PCT International Search Report and Written Opinion of International Searching Authority dated Nov. 25, 2016 corresponding to PCT International Application No. PCT/AU2016/050821 filed Aug. 31, 2016.

*Primary Examiner* — Huy Q Phan
*Assistant Examiner* — David B Frederiksen

(57) ABSTRACT

A system 10 and associated method for detecting a material discontinuity in a magnetisable article 12 has a sensor unit 16 which includes a magnet 18 and at least one magnetic field coupling sensor S. The magnet 18 is supported a distance above the rail 12 so that the lines of magnetic flux 22 loop through the rail 12. The magnetic field of the magnet 18 causes the surface 14 of the rail 12 directly below the magnet 18 to become polarised opposite to the facing pole of the magnet 18 and the regions distant from the magnet 18 to become inversely polarised. The coupling sensor S is placed and held at a fixed position relative to and in the active magnetic field of the magnet 18. The coupling sensor S measures the flux coupling between the rail 12 and the magnet 18.

7 Claims, 6 Drawing Sheets

(56) References Cited

U.S. PATENT DOCUMENTS

| | | | |
|---|---|---|---|
| 5,105,151 A | 4/1992 | Takahashi et al. | |
| 5,128,613 A * | 7/1992 | Takahashi | G01N 27/72 324/235 |
| 5,336,998 A * | 8/1994 | Watts | G01N 27/82 324/235 |
| 5,442,287 A | 8/1995 | Kammann et al. | |
| 5,786,750 A * | 7/1998 | Cooper | B61L 23/044 246/121 |
| 6,150,809 A * | 11/2000 | Tiernan | G01N 27/82 324/225 |
| 6,549,005 B1 * | 4/2003 | Hay | G01N 27/82 324/217 |
| 8,914,171 B2 * | 12/2014 | Noffsinger | B61L 3/121 701/19 |
| 9,701,326 B2 * | 7/2017 | Kull | B61L 23/044 |
| 9,889,869 B2 * | 2/2018 | Kull | B61L 27/0088 |
| 2002/0065610 A1 * | 5/2002 | Clark | B61D 15/00 702/35 |
| 2003/0020469 A1 | 1/2003 | Katragadda et al. | |
| 2004/0041560 A1 | 3/2004 | Walters et al. | |
| 2005/0285588 A1 | 12/2005 | Katragadda et al. | |
| 2007/0250277 A1 * | 10/2007 | Hagit | G01N 27/20 702/64 |
| 2008/0276711 A1 * | 11/2008 | Nichiforenco | G01N 27/9026 73/643 |
| 2009/0326746 A1 * | 12/2009 | Mian | B61L 27/0088 701/19 |
| 2010/0042336 A1 * | 2/2010 | Lee | G01N 27/9006 702/38 |
| 2010/0148766 A1 | 6/2010 | Weischedel | |
| 2013/0113472 A1 | 5/2013 | Blair et al. | |
| 2013/0284859 A1 * | 10/2013 | Polivka | B61L 27/0055 246/34 R |

FOREIGN PATENT DOCUMENTS

| | | |
|---|---|---|
| WO | 9744654 A1 | 11/1997 |
| WO | 2004035368 A1 | 4/2004 |
| WO | 2009063218 A2 | 5/2009 |
| WO | 2015120550 A1 | 8/2015 |

* cited by examiner

METHOD AND SYSTEM FOR DETECTING A MATERIAL DISCONTINUITY IN A MAGNETISABLE ARTICLE

TECHNICAL FIELD

A method and system are disclosed for detecting a material discontinuity in a magnetisable article. Embodiments of the disclosed method and system may have application in for example, but not limited to, detecting a break in the article or a change in the material composition of the article. In one more specific application the article may be a rail of a railway track.

BACKGROUND ART

The Applicant has developed a range of technologies to detect discontinuities or other defects in railway tracks and defects in rail wheels. Some of these technologies rely on the sensing and subsequent analysis of remnant magnetic fields. One example is described in the applicant's publication number US 2013/0113472. This US publication describes a method of magnetic crack depth detection. This measures remnant magnetic field flux leakage for a length of a rail of a railway track and by comparing the measurements with previous empirical measurements enables prediction of the depth of a crack. Equipment utilising this method has been successfully commercialised.

The presently disclosed system and method is a result of further research and development in the art of magnetic material discontinuity detection.

The above reference to the background art does not constitute an admission that the art forms part of the common general knowledge of a person of ordinary skill in the art. Further the above reference to background art is not intended to limit the application of the method and system disclosed herein.

SUMMARY OF THE DISCLOSURE

In a first aspect there is disclosed a method of detecting a material discontinuity in a magnetisable article comprising:
traversing a magnet along the article so that lines of magnetic flux from an active magnetic field of the magnet loop through the article and magnetically couple the magnet to the article;
placing at least one magnetic field coupling sensor at a fixed position relative to the magnet and in the active magnetic field of the magnet wherein the at least one coupling sensor traverses along the article with the magnet to sample magnetic coupling between the magnet and the article; and
analysing the measured magnetic coupling in the active magnetic field for a change in the magnetic coupling during the traversing of the magnet and using the change in magnetic coupling to detect a discontinuity in the article.

In one embodiment analysing information comprises making a determination of a size of the discontinuity.

In one embodiment the at least one coupling sensor is arranged to sense at least direction of the magnetic flux looping through the article.

In one embodiment the at least one coupling sensor is arranged to sense at least density of the magnetic flux looping through the article.

In one embodiment the article is a rail for a rail transport vehicle. In any alternate embodiment the article is a wheel for a rail transport vehicle In one embodiment the method comprises acquiring longitudinal samples of the magnetic field along the rail simultaneously with acquisition of samples of magnetic coupling from the one or more coupling sensors;
between instants at which the samples are acquired, moving: the magnet, the coupling sensors and the displacement sensors in a fixed juxtaposition relative to each other along the article; and
using the samples from the displacement sensors to provide an estimate of the displacement of the magnet along the article between successive sampling instants.

In one embodiment using the samples from the displacement sensors to provide an estimate of the displacement of the magnet comprises cross correlating the samples acquired from the displacement sensors at successive sampling instants.

In one embodiment the method comprises combining the samples from the coupling sensors and the displacement sensors to provide an indication of magnetic field coupling across a discontinuity in the displacement domain.

In a second aspect there is disclosed a system for detecting a material discontinuity in a magnetisable article comprising:
a magnet capable of being traversed along the article so that lines of magnetic flux from an active magnetic field of the magnet loop through the article and magnetically couple the magnet to the article; and
at least one magnetic field sensor located at a fixed position relative to the magnetic and in the active magnetic field of the magnet wherein the at least one sensor traverses along the article with the magnet and is arranged to measure magnetic coupling between the magnet and the article.

In one embodiment the system further comprises a magnetic flux analysis system arranged to analyse information pertaining to the magnetic flux provided by the at least one sensor to provide an indication of a characteristic of the surface penetrating discontinuity.

In one embodiment the at least one magnetic field coupling sensor is one of a plurality of coupling sensor arranged in an array in a direction transverse to a direction of traverse of the magnet along the article.

In one embodiment the system comprises a displacement sensor acquiring samples of the magnetic field at multiple locations spaced longitudinally along the rail simultaneously with acquisition of samples of magnetic coupling from the one or more coupling sensors.

In a third aspect there is disclosed a method of estimating spatial displacement with respect to a magnetic field response of an article comprising:
acquiring multiple samples of magnetic field coupling between an article and a magnet at a known sampling frequency wherein the magnet is capable of being moved in a direction to traverse a length of the article the and wherein the multiple samples are simultaneously acquires at each of a plurality of locations that are spaced from each other in the direction of the length of the article;
in a period between successive sampling instants moving the magnet and the an apparatus capable of acquiring the samples in a fixed spatial relationship with each other along the article; and processing the acquired multiple samples to provide an estimate of the displacement of the magnetic along the article between successive sampling instants.

In a fourth aspect there is disclosed a method of facilitating characterization of a material discontinuity in a ferromagnetic article comprising:

applying a magnetic field to the article;
acquiring multiple samples of magnetic field coupling between the magnet and the article at a known sampling frequency;
in a period between the successive sampling instants moving an apparatus capable of applying the magnetic field and acquiring the samples in a fixed spatial relationship with each other along the article;
processing the acquired multiple samples to provide an estimate of the displacement of the apparatus along the article between successive sampling instants;
using the estimates of displacement to facilitate characterization of the feature in the article.

In one embodiment acquiring multiple samples of magnetic field coupling comprises acquiring a first multiple of samples at each of a plurality of locations that are spaced from each other in the direction of motion of the article; and a second multiple of sample at each of a plurality of locations that are spaced from each other transverse to the direction of motion of the article.

In one embodiment processing the acquired multiple samples to provide an estimate of the displacement comprises cross correlating the samples acquired at successive sampling instants from the plurality of locations that are spaced from each other in the direction of the length of the article or the direction of motion of the article.

In a fifth aspect there is disclosed a method of detecting a break in a railway track, the method comprising:

acquiring one or more samples of magnetic field coupling between a magnet and a rail in a railway track to facilitate an estimation of depth of a crack in the rail;
simultaneously acquiring longitudinal samples of the magnetic field coupling along the rail;
between instants at which the samples are acquired, moving an apparatus capable of acquiring the samples along the rail;
using the longitudinal samples to provide an estimate of the displacement of the apparatus along the rail between successive sampling instants to facilitate an estimation of width of the crack; and
processing the depth and width estimations to enable the surface penetrating feature to be characterised as one of a plurality of features including a break in the rail.

In a sixth aspect there is disclosed a system for estimating spatial displacement along a magnetisable article with respect to a defect sufficient to cause a detectable change in natural polarization boundary of an active magnetic field couple with the article comprising:

an apparatus supporting a magnetic field measuring system arranged to sense magnetic field strength at multiple spaced locations in a length direction of the article at each sampling instant of a known sampling frequency, the apparatus being capable of being moved in the length direction along the article; and
a processor arranged to process the measured magnetic field strength at the multiple locations at successive sampling instants to provide an estimate of displacement of the apparatus at each sampling instant along the article in the vicinity of the defect.

BRIEF DESCRIPTION OF THE DRAWINGS

Notwithstanding any other forms which may fall within the scope of the system and method as set forth in the Summary, specific embodiments will now be described by way of example only, with reference to the accompanying drawings in which.

DETAILED DESCRIPTION OF SPECIFIC EMBODIMENTS

Figure 1:
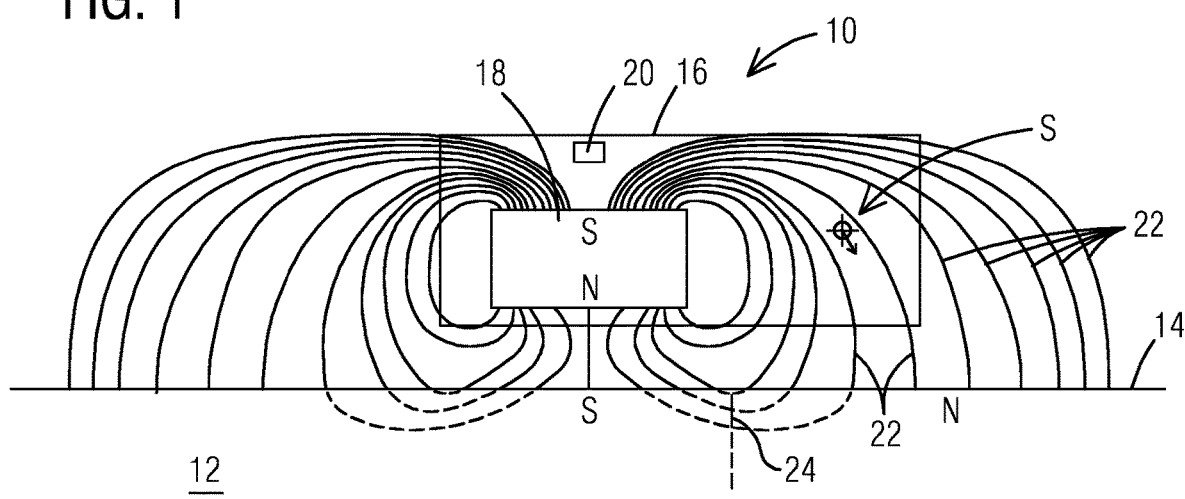
FIG. 1 is a schematic representation of part of the disclosed system for detecting a material discontinuity in a portion of a magnetisable article which is free of any material discontinuity.
Figure 2:
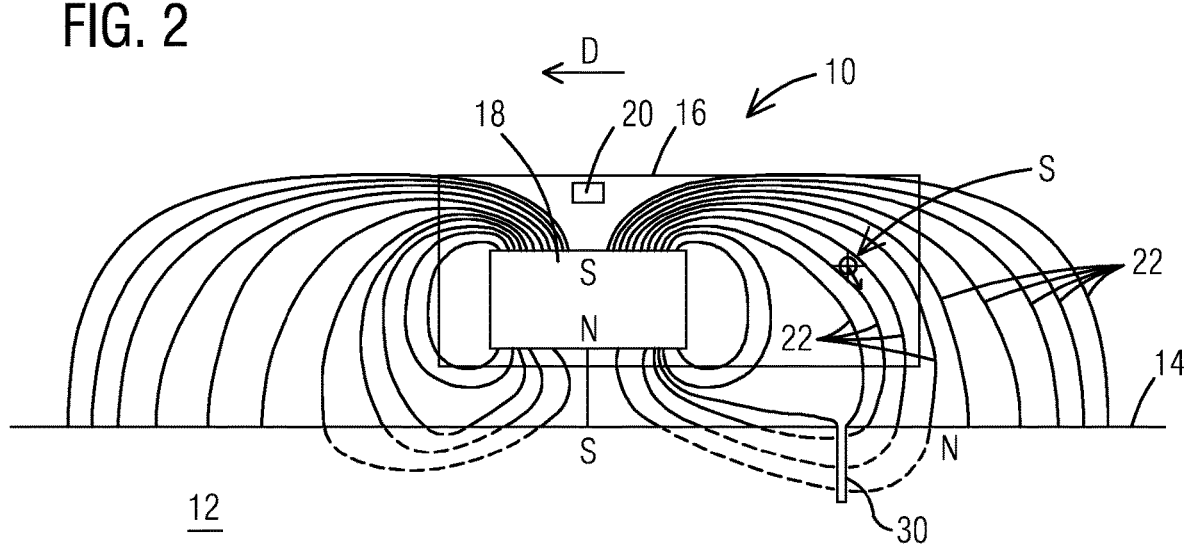
FIG. 2 is a schematic representation of the disclosed system shown in FIG. 1 for a portion of a magnetisable article which includes a material discontinuity.

FIGS. 1 and 2 depict one embodiment of the disclosed system 10 and associated method for detecting a material discontinuity in a magnetisable article. The term "material discontinuity" throughout this specification is intended to include any discontinuity in the material of the article such a crack, spall, pit, weld, coupling or embedding of a device or sensor to or in the article, or any other material property change in the article, whether or not the discontinuity penetrates the surface of the article. In the illustrated embodiment the magnetisable article is a rail 12 of a railway track. The rail 12 is shown side on and has an upper tread surface 14.

The system 10 has a sensor unit 16 which includes a magnet 18 and at least one magnetic field coupling sensor S. In this particular embodiment the magnet 18 is orientated so that its north pole faces the tread surface 14. The system 10 supports the magnet 18 a fixed height above the tread surface 14. Lines of magnetic flux 22 loop from the North Pole to the South Pole. The magnet 18 is supported a distance above the rail 12 so that the lines of magnetic flux 22 loop through the rail 12.

The magnetic field of the magnet 18 causes the surface 14 of the rail 12 directly below the magnet 18 to become polarised opposite to the facing pole of the magnet 18 and the regions distant from the magnet 18 to become inversely polarised. A natural boundary 24 is created in the surface 14 at any one instant in time in the vicinity of the magnet 18 where the magnetic polarisation transitions from North to South.

The coupling sensor S is placed and held at a fixed position relative to and in the active magnetic field of the magnet 18. The coupling sensor S which may be a Hall Effect sensor is able to sense characteristics of the flux 22. The characteristics include one or preferably both of the direction of the flux 22 and the flux density or field strength. This in effect measures the flux coupling between the rail 12 and the magnet 18.

The sensor unit 16 of the system 10 is traversed along the length direction of the rail 12. Signals from the coupling sensor S are fed to an analysis system 20 which can conduct various operations on the signals. This includes recording the signal (magnetic field) strength along the rail 12 for example as shown in FIG. 3 and/or conducting mathematical operations on the signal to determine whether the signal is representative of a material discontinuity and if so, the type of discontinuity.

In FIG. 1 the portion of the rail 12 has no significant material discontinuity. A representation of the signal obtained from the coupling sensor S of the system 10 traversing that portion may take a form as shown by curve C1 shown in FIG. 3. In essence this is simply a noise signature of relatively small amplitude and of constant polarity.

FIG. 2 represents the system 10 at an instant of time traversing a material discontinuity 30 in the rail 12. In this specific example the discontinuity is in the form of a break or crack in the rail. The discontinuity/crack 30 creates an artificial polarisation boundary 24*a* in the rail 12. In effect discontinuity/crack 30 displaces the location of the natural boundary 24 as shown in FIG. 1 which would exist in the absence of the crack 30. The effective shift in the polarisation boundary from the natural boundary 24 to the artificial boundary 24*a* created by the crack 30 distorts the flux 22 of the active magnetic field sensed by the sensor S producing a change in the flux coupling between the magnet 18 and the rail 12. The distortion may be in terms of both the direction of the magnetic flux and its density. In particular the density is expected to be higher or concentrated near the edges of the discontinuity/crack 30.

Figure 3:
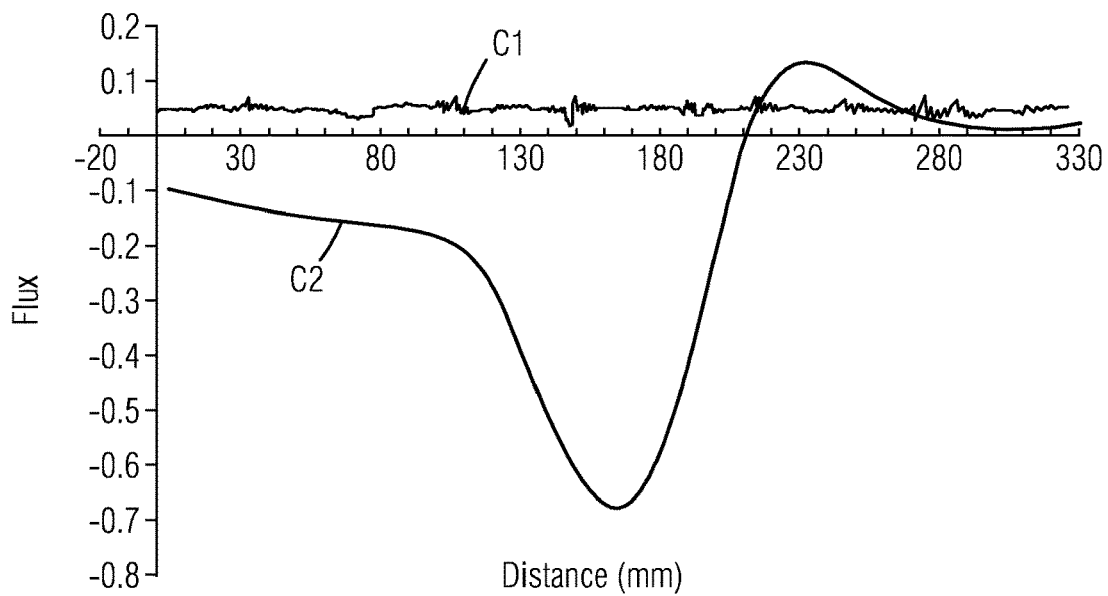
FIG. 3 is a representation of signals generated by the system when traversing a portion of the magnetisable article with and without a material discontinuity.

The curve C2 in FIG. 3 is representative of the magnetic flux coupling (i.e. flux signature) across and in the immediate vicinity of the discontinuity/crack 30. The signature shows a significant disturbance or variation in comparison to the curve C1. The signature may be analysed or compared with empirically derived result to enable a determination as to the nature of the specific material discontinuity.

The analysis system 20 incorporated in the system 10 may analyse the signature C2 to characterise a discontinuity on the basis of features such as the amplitude of the disturbance and the width of the disturbance.

The analysis system 20 which is arranged to process the signals from the sensor(s) and provide an indication of the change in material properties may perform at least the following signal processing step:
  Low pass time based filtering of the signals to reduce noise.
  High pass displacement based filter to detect signal components with a specific frequency indicative of particular types of discontinuity, for example a surface penetrating crack or a weld in a rail. Such frequencies may be derived by empirical measurement of known or separately measurable characteristics.
  Measure the peak to peak and gradient of the signal subsequent to the above filtering to determine the severity or size discontinuity Embodiments of the system 10 can detect material discontinuities such as, but not limited to surface penetrating cracks which may have a width in the order of about 0.1 mm or more, a change in material composition such as would arise from a weld in the rail 12 or a device in the or in-line with the rail such as a switch. In one embodiment the magnet 18 may produce a magnetic field of about 0.023 tesla at a point where passes it through the sensor(s) S, with the sensor(s) S being spaced about 40 mm above the article 12 and about 40 mm to the side of the magnet 18. The magnet 18 itself may be about 20 mm above the article 12. In use the sensor unit 16 may be traversed at a speed of between 0-140 m/s.

Figure 10:
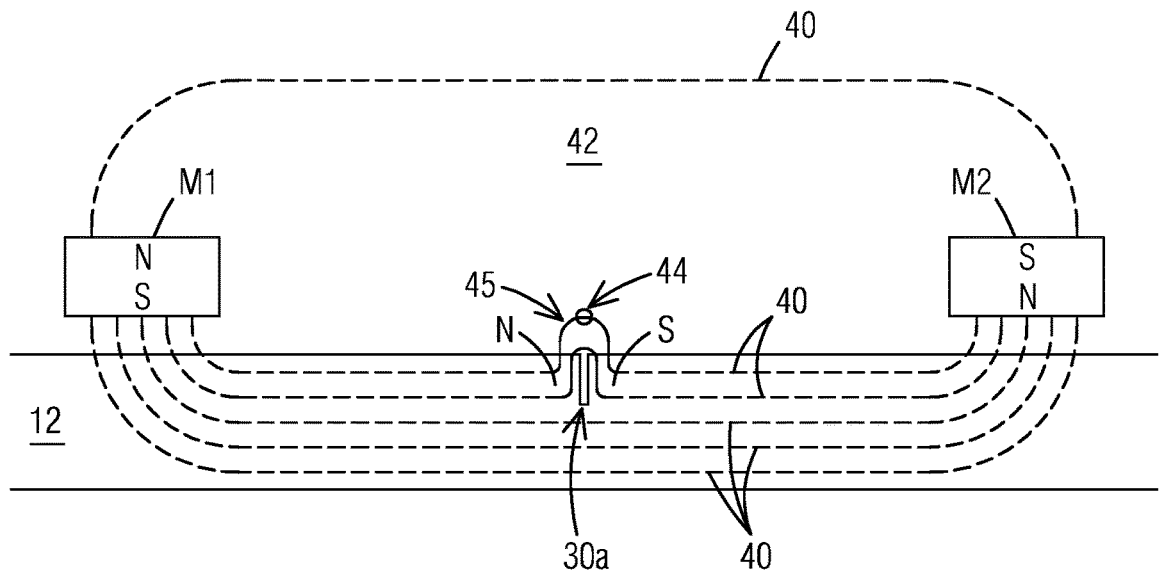
FIG. 10 illustrates prior art technique for non-destructive testing using flux leakage measurement.

The sensing or measurement of flux coupling or changes in flux coupling in the disclosed method and system is different to and distinguishable from measurement of flux leakage which is common in non-destructive testing (NDT). FIG. 10 illustrates a general arrangement for measuring flux leakage. Here lines of flux 40 circulate through magnet M1, the article/rail 12, magnet M2, and free air 42. The rail has a surface defect, e.g. a spall 30*a* causing a leakage path 45 of flux from and back to the rail 12. The flux leaked from the rail is sensed by a sensor 44. This is to be contrast with the embodiment of the current system 10 where it is the flux coupling though the air between the rail 12 and the magnet 18 that is being ended and used to determine the existence of a material discontinuity.

Figure 4:
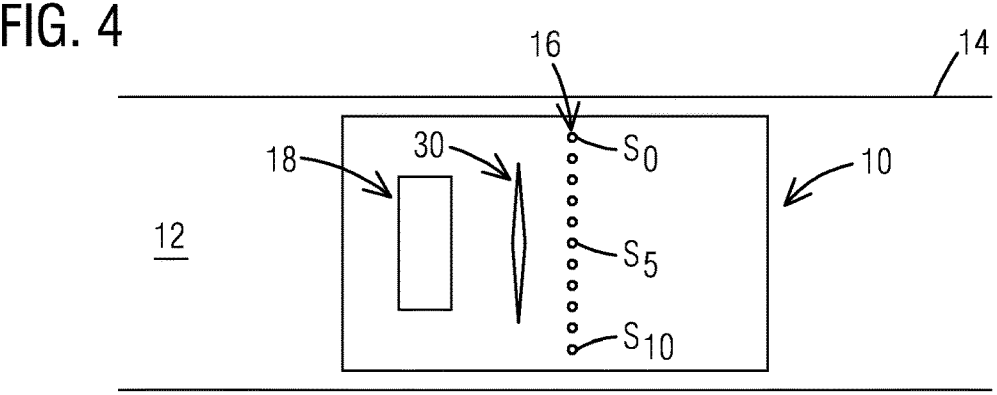
FIG. 4 is a schematic representation in plan elevation of a second embodiment of the disclosed system.

Enhanced results may be obtained by providing an array of coupling sensors S0-S10 (herein after referred to in general "sensors Sn") rather than a single coupling sensor S. The array of coupling sensors Sn would be arranged in a line transverse to the direction of movement of the sensing unit 16 as shown in FIG. 4. In the case of the magnetisable article being a rail 12, the array of coupling sensors Sn is arranged to extend transversely across the tread surface 14.

It will be seen that the curve C2 in FIG. 3 shows magnetic flux strength (i.e. flux coupling) measures against displacement and in the immediate vicinity of the discontinuity/crack 30. Displacement can be measured one of several traditional ways such as by using GPS, wheel tacho readings or velocity measurement against time. However the disclosed system 10 and associated method may be further enhanced to facilitate an estimation of spatial displacement in the direction of travel across the artificial boundary 30 solely by way of time and magnetic field measurement. This therefore does away with the need for on-board GPS, wheel tacos or velocity measurements.

Figure 5:
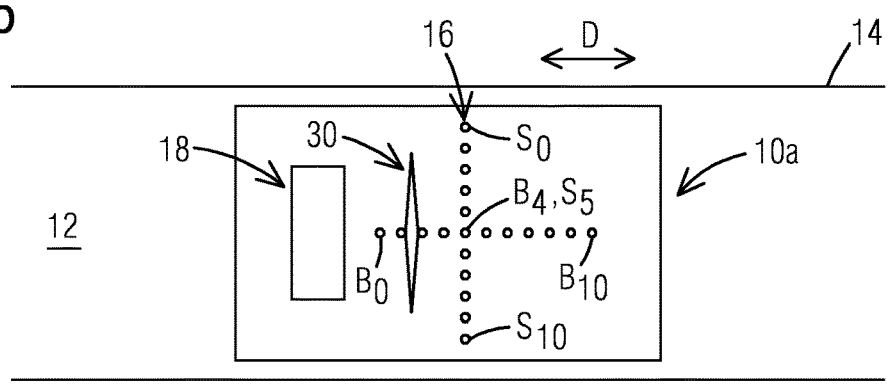
FIG. 5 is a schematic representation of a third embodiment of the disclosed system which incorporates a system and method for spatial displacement measurement/estimation.

FIG. 5 illustrates an enhanced system 10*a* which creates its own spatial domain, in combination with the array of coupling sensors Sn of the embodiment shown in FIG. 4. The system 10*a* comprises a magnetic field measuring system arranged to sense magnetic field strength at multiple spaced locations in a length direction D of the article which in this example is the rail 12. The magnetic field measuring system is in the form of an array of displacement sensors B0-B10 (herein after referred to in general "displacement sensors Bn"). The length direction D is either of the opposite directions that run parallel to the length of the rail 12. The sensor unit 16 is arranged to collect readings from each of the sensors Bn at each sampling instant. The displacement sensors Bn may be in the form of Hall Effect sensors.

The array of displacement sensors Bn is arranged parallel to the direction D and disposed within the unit 16 so as to lie along a centre line of the rail 12. It should be understood however that the array of displacement sensors Bn does not necessarily need to be along the centre line of the rail 12 or other article in relation to which the system 10 is used. The purpose of the array of sensors Bn is to provide an estimate of displacement of the unit 16 with reference to the presence of the discontinuity/crack 30.

Figure 6:
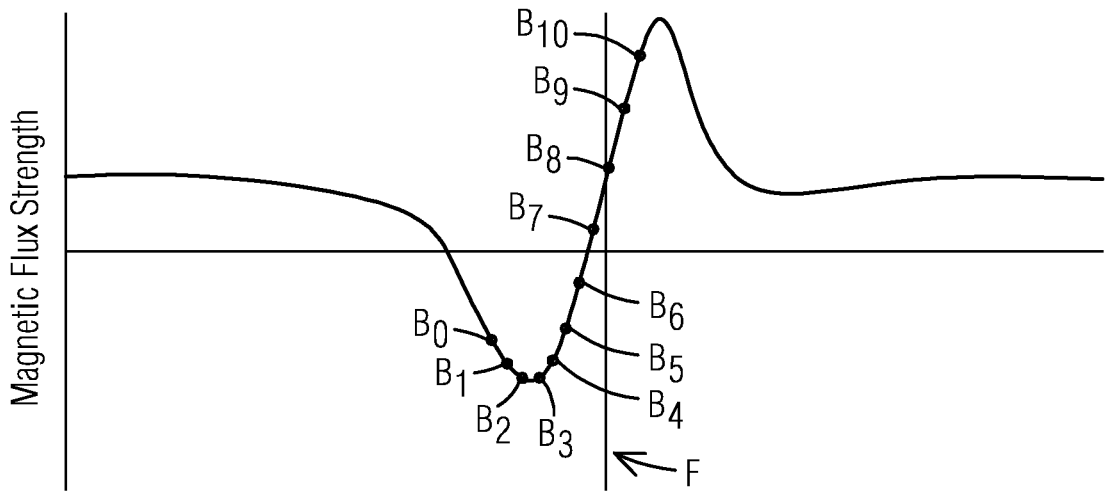
FIG. 6 is a representation of a possible signal from the sensor array extending in the direction of the article used in the system and method for spatial displacement measurement/estimation embodiments of the system shown in FIG. 5.

The magnetic field coupling/strength measured from the sensors Bn at one sampling instant is plotted on FIG. 6 on a waveform that would arise from a field strength measurement in the vicinity of the discontinuity/crack 30. The line F represents the centre line of the discontinuity/crack 30. At this particular sampling instant the system 10a is located in a position such that the discontinuity/crack 30 is in a region between the sensors B7 and B8.

It should be noted that the system 10a does not receive any speed or displacement information from external sources. The coupling sensors Sn capture magnetic field strength/coupling measurements at each sampling time. This can be used to categorize the magnetic signature of the coupled magnetic field and thus enable characterisation of the discontinuity/crack 30 in terms of its transverse width, length and its depth. However, without knowing how far the unit 16 travels at each sampling instant determining characteristics of the magnetic field coupling and therefore the width characteristics in the discontinuity/crack 30 in direction of D becomes problematic.

Figure 7:
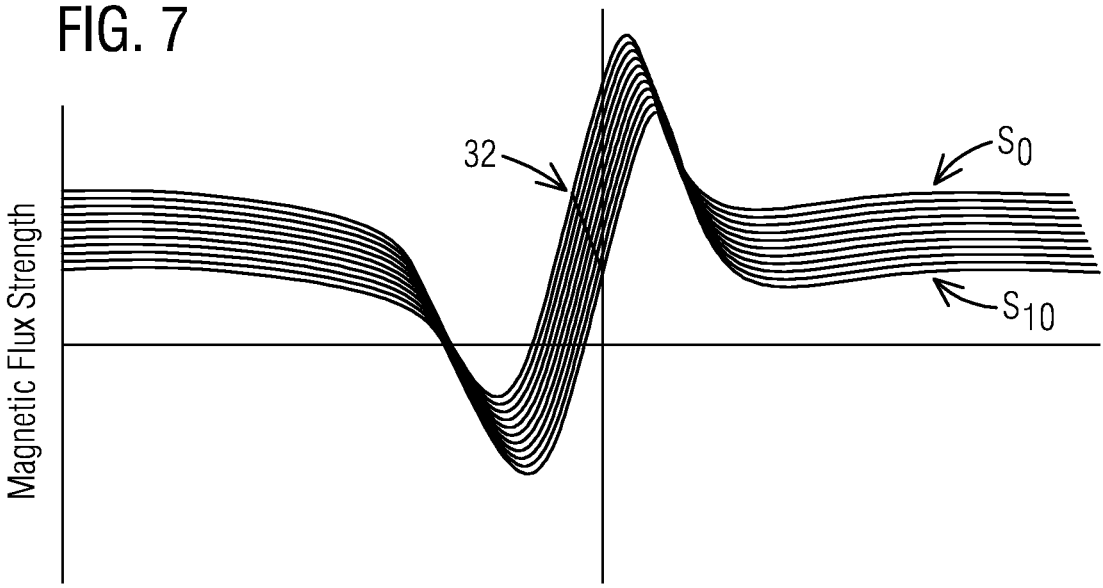
FIG. 7 is a representation of flux signature from each of the sensors in the sensor array shown in FIG. 4.

FIG. 7 depicts reconstructed spatially based signals from each of the sensors Sn, as the unit 16 passes over the discontinuity/crack 30 in the rail 12. The change in the magnetic field measurement from the sensor unit 16 enables determination of displacement of the waveform shown in FIG. 2 through the sensor array Bn and therefore the distance that the unit 16 is moved down the rail 18. The discontinuity/crack 30 can be classified (e.g. broken rail, spall, etc.) on the information in this reconstructed set of signals.

Processing the signals received from the displacement sensors Bn at sequential sampling times enables determination, or at least a prediction, of the distance travelled by the unit 16 between excessive sampling times. This enables the reconstruction of the signals received from the coupling sensors Sn in the displacement domain which in turn enables width information, and therefore classification, of the discontinuity/crack 30, for example as a broken rail.

Figure 8A:
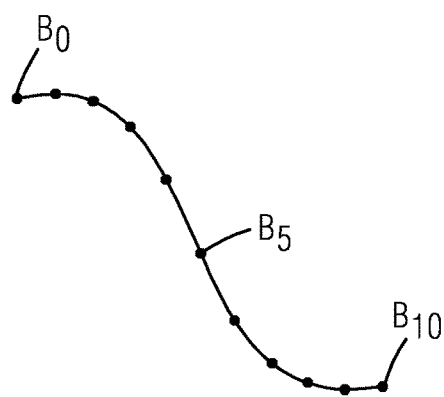
FIGS. 8a-8d provide a graphical representation of a process of transforming a time based sample to corresponding displacement information.
Figure 8B:
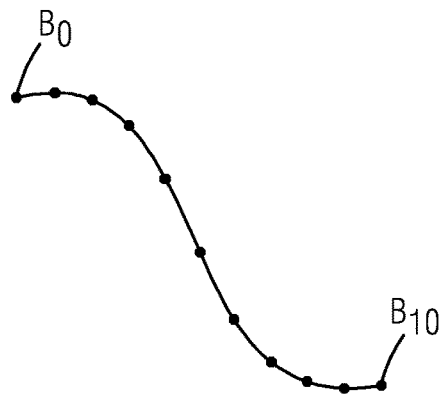

FIGS. 8a-8b illustrate one processing method for using the measurements derived from the displacement sensors Bn at successive sampling instants to determine displacement. FIG. 8a depicts the magnetic field strength in the active magnetic field as measured by each of the sensors Bn at one sampling instant. Thus the points B0-B10 in FIG. 8a depict the field strength/coupling of the magnetic field across the discontinuity/crack 30 sensed by the respective sensors. In effect FIG. 8a is depicting the magnetic signature of the discontinuity/crack 30 at one instant in time.

The next stage in the processing of the signals to determine displacement is to fit a curve between the sample points B0-B10. In this example this is by way of cubic spline interpolation between sample points shown in FIG. 8b.

Figure 8C:
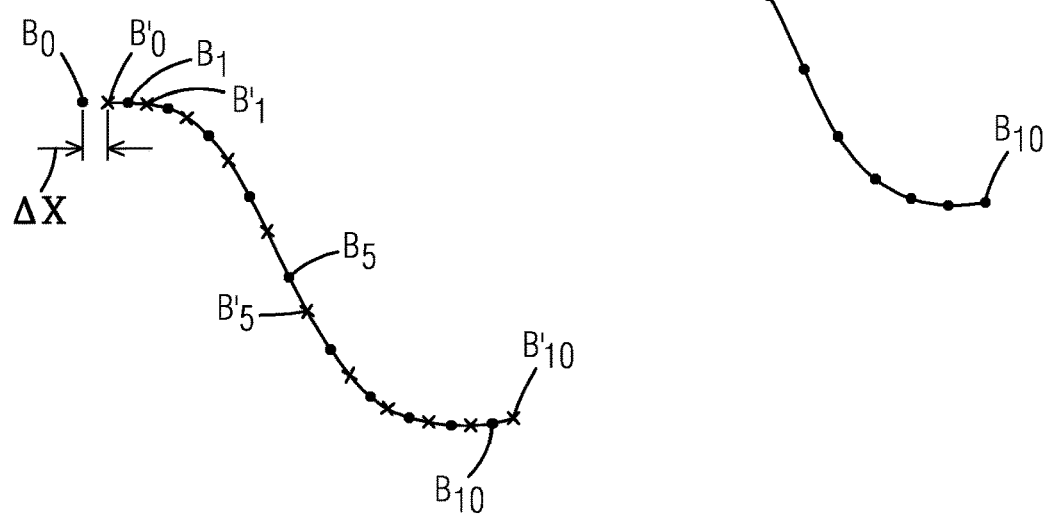
Figure 8D:
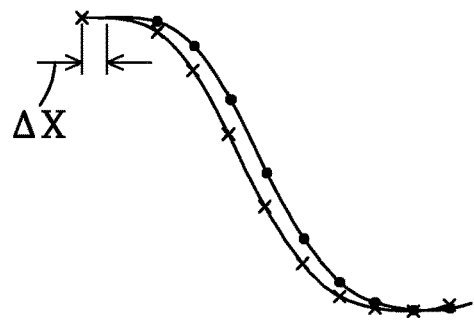

At the next sampling instant a second set of magnetic field strength measurements is taken by the displacement sensors B0-B10. These are shown in FIG. 8c as samples B'0-B'10. It would be appreciated that at this second sampling instant, the unit 16 has moved a distance along the rail 12. But this distance of travel is not at this point in time known. However, the time between the samples is known as this can be determined from the known sampling frequency.

In FIG. 8c the distance Δx, being the horizontal distance along the cubic spline between the magnetic field strength measurements of the same sensor Bn is not known. This is the same as the physical displacement of the unit 16 between successive sampling times. By processing the sets of samples it is possible to estimate the distance Δx. One possible processing technique or method is to cross correlate the sample set within the cubic spline until the correlation error is minimised. The amount of shift at the point of minimum correlation error is equivalent to the estimated shift Δx.

Accordingly, at this stage both Δx is known and the sampling frequency is known. This also allows for estimated speed of travel of the unit 16 to be computed. It should be recognised that this speed is computed without the need of external inputs from the vehicle (for example to which the system 10a is attached). Thus the system 10a enables estimation of both the distance travelled by the unit 16 between successive sampling times and the overall linear speed of the unit 16. Nevertheless if desired and particularly if readily available from existing on-board equipment distance data or calculations derived externally of the system 10a may be used in addition to that from the system 10a to provide error checking or auditing.

Those skilled in the art may recognise that this process will only be accurate when there is a discontinuity/crack 30 that can be sensed by the unit 16. If there is no discontinuity/crack 30 or other feature to produce a change in flux coupling in the active magnetic field then this process breaks down and does not provide reliable or useful information. However, this is of no consequence in a practical sense. The reason for this is that if there is no magnetic flux coupling variation to sense then there is no discontinuity/crack 30 in the track that is of concern.

Thus using the processing described above in relation to FIGS. 8a-8d the displacement along the magnetic signature can be calculated in real time. This allows for the reconstruction of a time based sampling of the array Sn to be spatial based sampling.

Figure 9:
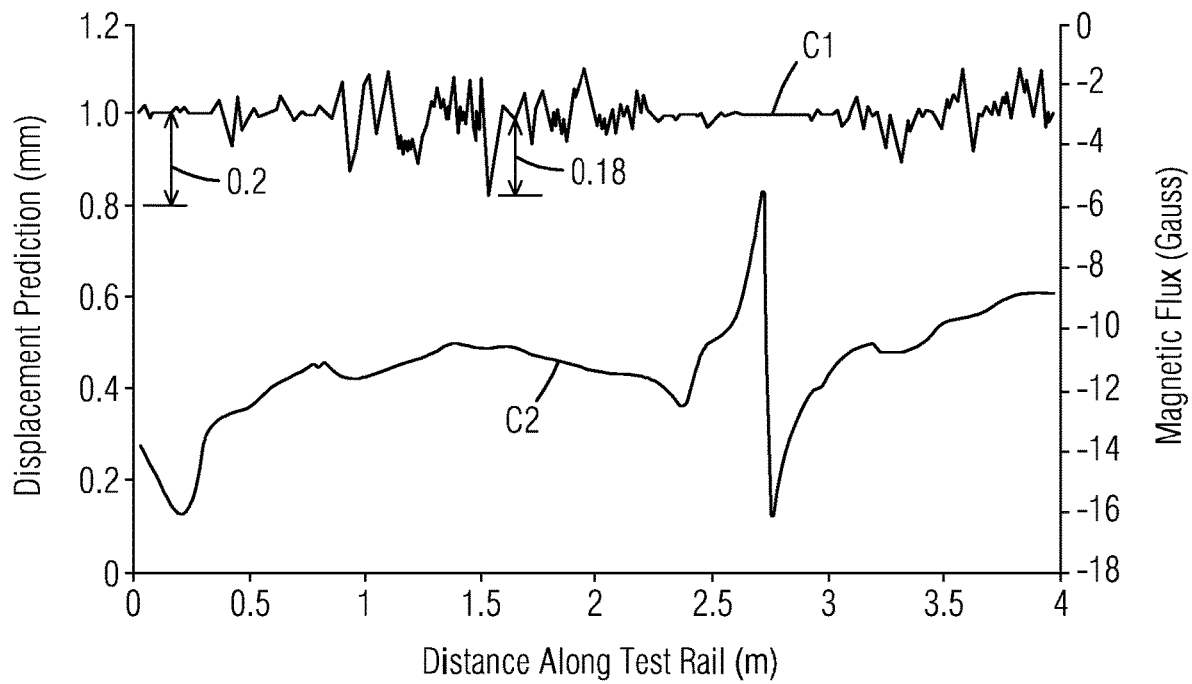
FIG. 9 illustrates a set of test results showing predicted displacement using an embodiment of the system and method for spatial displacement measurement/estimation shown in FIG. 6 against an actual displacement of one millimeter.

FIG. 9 shows a set of test results where unit 16 is moved sequentially by a known distance of one millimeter between sampling times compared with the resultant distance as measured or estimated by an embodiment of the present method and system.

Wave C1 is the magnetic flux measured along a four (4) meter section of rail 12 and having a discontinuity/crack 30. The discontinuity/crack 30 produces the spike in the wave C1. On the left hand side is a scale showing predicted displacement utilising the disclosed system and method. The actual displacement is one millimeter. The estimated displacement is shown by the curve C2. This shows a maximum error of about 0.18 millimetres in a region where there is little variation in a magnetic field signature. However, in the region where the spike in the wave C1 exists, the estimated displacement is extremely close to the 1 millimeter known displacement. As previously mentioned lack of accuracy in regions where there is no significant spike or change in the magnetic field strength is of little practical value.

The sensor array Bn which enables spatial displacement measurement/estimation and the active field array of sensors Sn are independent of each other in terms of their operation and the information/data that they provide. The sensor array Sn can be used for example with traditional displacement measurement systems instead with the sensor array Bn. Similarly the sensor array Bn can be used totally independently as a stand-alone method and system of estimating spatial displacement with respect to a magnetic response associated with an anomaly in an article. In broad terms the method of comprises: applying a magnetic field to an article such as but not limited to a rail 12 or a rail wheel; acquiring multiple magnetic field samples at a known sampling frequency of a magnetic response of the article on or to the applied magnetic field; in a period between the successive sampling instants moving an apparatus capable of acquiring the samples relative to the article; and processing the acquired multiple samples to provide an estimate of the displacement of the apparatus between successive sampling instants.

The corresponding system for estimating spatial displacement with respect to a magnetic response of an article to an applied magnetic field in broad terms comprises: an apparatus supporting a magnetic field measuring system arranged to sense magnetic field characteristics at multiple spaced locations in a length direction of the article at each sampling instant of a known sampling frequency, the apparatus being capable of being moved in the length direction along the article; and a processor arranged to process the measured magnetic field strength at the multiple locations at successive sampling instants to provide an estimate of displacement of the apparatus at each sampling instant relative to the magnetic field.

Figure 11:
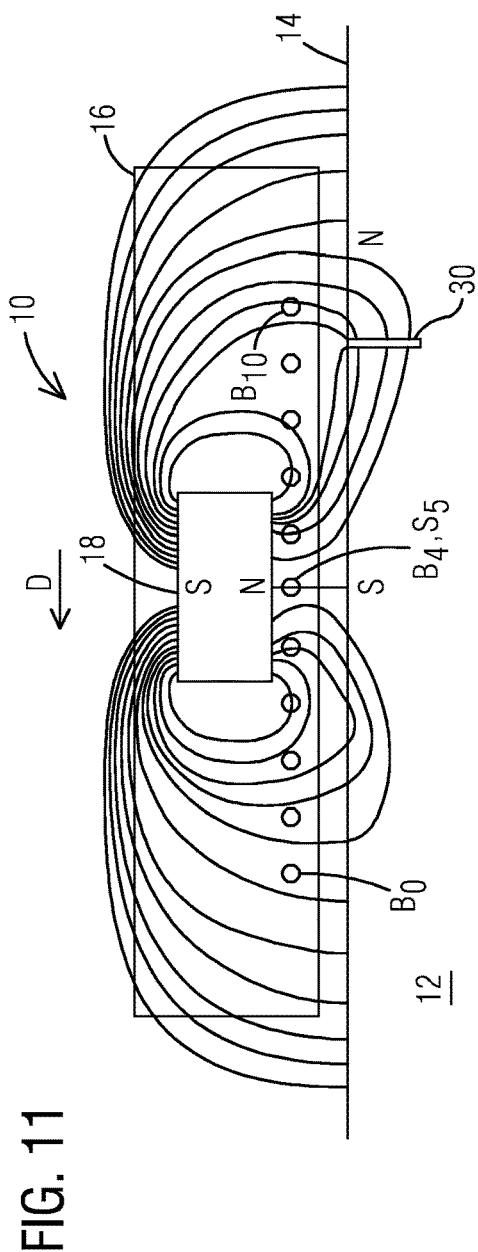
FIG. 11 is a representation of a further embodiment of the disclosed system.

Whist specific embodiments of the system and method have been described; it should be appreciated that the system and method may be embodied in many other forms. For example FIGS. 1, 2, 4 and 5 show the sensors Sn, Bn as being located to the side of the magnet 18. However they may be arrange symmetrically below the magnet 18 in the unit 16 as shown in FIG. 11. Thus in this embodiment the sensors lie between the magnet 18 and the rail 12. The relative location of the magnet(s) and the sensors in the active magnetic field produced by the magnet(s) is not critical to embodiments of the system and associated method. The only practical limitation is, given that magnetic field strength decreases with the square of distance, that the sensors should be close enough or the field strength sufficient so that variations in coupling are within the measurement sensitivity of the sensors Sn, Bn.

Figure 12:
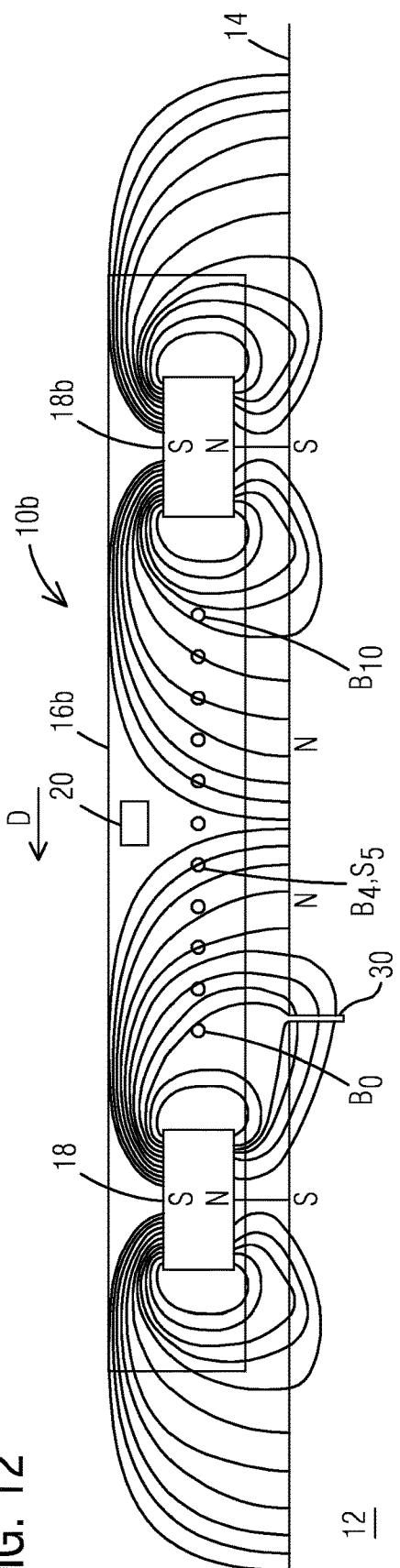
FIG. 12 is a representation of yet a further embodiment of the disclosed system.

In a further variation shown in FIG. 12, instead of one magnet 18 producing the active magnetic field as in systems 10 and 10a, embodiments of the system 10, 10a may have more than one magnet to produce the active magnetic field. FIG. 12 shows a system 10b having two magnets 18 and 18b between which one or both arrays of sensors Sn, Bn can be located.

In yet a further variation instead of a single longitudinal array of displacement sensors Bn and a single array of coupling sensors Sn embodiments of the system 10a may be provided with a rectangular (i.e. including square) matrix of sensors Bn, Sn having two or more linear arrays of sensors Sn and/or Bn. For example an embodiment of the system 10a may have a square 11×11 array of sensors. Signals from sensors in transverse arrays are processed as coupling sensors Sn as describes above, while signals form the longitudinal arrays are processed as displacement sensors Bn as described above. It is believed that this would provide enhanced this will provide enhanced accuracy and characterization of material discontinuities. Implementation of this embodiment will require additional sensors and processing.

In the claims which follow, and in the preceding description, except where the context requires otherwise due to express language or necessary implication, the term "comprise" and variations such as "comprises" or "comprising" are used in an inclusive sense, i.e. to specify the presence of the stated features but not to preclude the presence or addition of further features in embodiments of the method and system as disclosed herein.

The invention claimed is:

1. A method of detecting a material discontinuity in a magnetisable article comprising:
   traversing a sensor unit comprising a magnet, at least one magnetic field coupling sensor and a displacement sensor along the magnetisable article so that lines of magnetic flux from an active magnetic field of the magnet loop through the magnetisable article and magnetically couple the magnet to the magnetisable article,
   wherein the magnet, the at least one magnetic field coupling sensor and the displacement sensor are disposed within the sensor unit in a fixed juxtaposition relative to each other,
   wherein the at least one magnetic field coupling sensor is placed at a fixed position relative to the magnet and in the active magnetic field of the magnet,
   wherein the at least one coupling sensor traverses along the magnetisable article with the magnet to sample magnetic coupling between the magnet and the magnetisable article; and
   analysing the measured magnetic coupling in the active magnetic field for a change in the magnetic coupling during the traversing of the sensor unit and using the change in magnetic coupling to detect a discontinuity in the magnetisable article, and further comprising:
   acquiring longitudinal samples of the magnetic field along the magnetisable article simultaneously with acquisition of samples of magnetic coupling from the at least one coupling sensor;
   between instants at which the samples are acquired, moving the sensor unit along the magnetisable article; and
   using the samples from the displacement sensor to provide an estimate of a displacement of the magnet along the magnetisable article between successive sampling instants.

2. The method according to claim 1, wherein the analysing comprises making a determination of a size of the discontinuity.

3. The method according to claim 1 wherein the at least one coupling sensor is arranged to sense at least direction of the magnetic flux looping through the magnetisable article.

4. The method according to claim 1 wherein the at least one coupling sensor is arranged to sense at least density of the magnetic flux looping through the magnetisable article.

5. The method according to claim 1 wherein the magnetisable article is a rail for a rail transport vehicle.

6. The method according to claim 1, wherein using the samples from the displacement sensor to provide the estimate of the displacement of the magnet comprises cross correlating the samples acquired from the displacement sensor at successive sampling instants.

7. The method according to claim 6, comprising combining the samples from the at least one coupling sensor and the displacement sensor to provide an indication of magnetic field coupling across the discontinuity in a displacement domain.

* * * * *